July 5, 1955            R. E. CHEROUVRIER            2,712,266
APPARATUS FOR VIEWING, PROJECTING OR MAGNIFYING
MICROFILMS OR SIMILAR DOCUMENTS
Filed Aug. 18, 1952            4 Sheets-Sheet 1
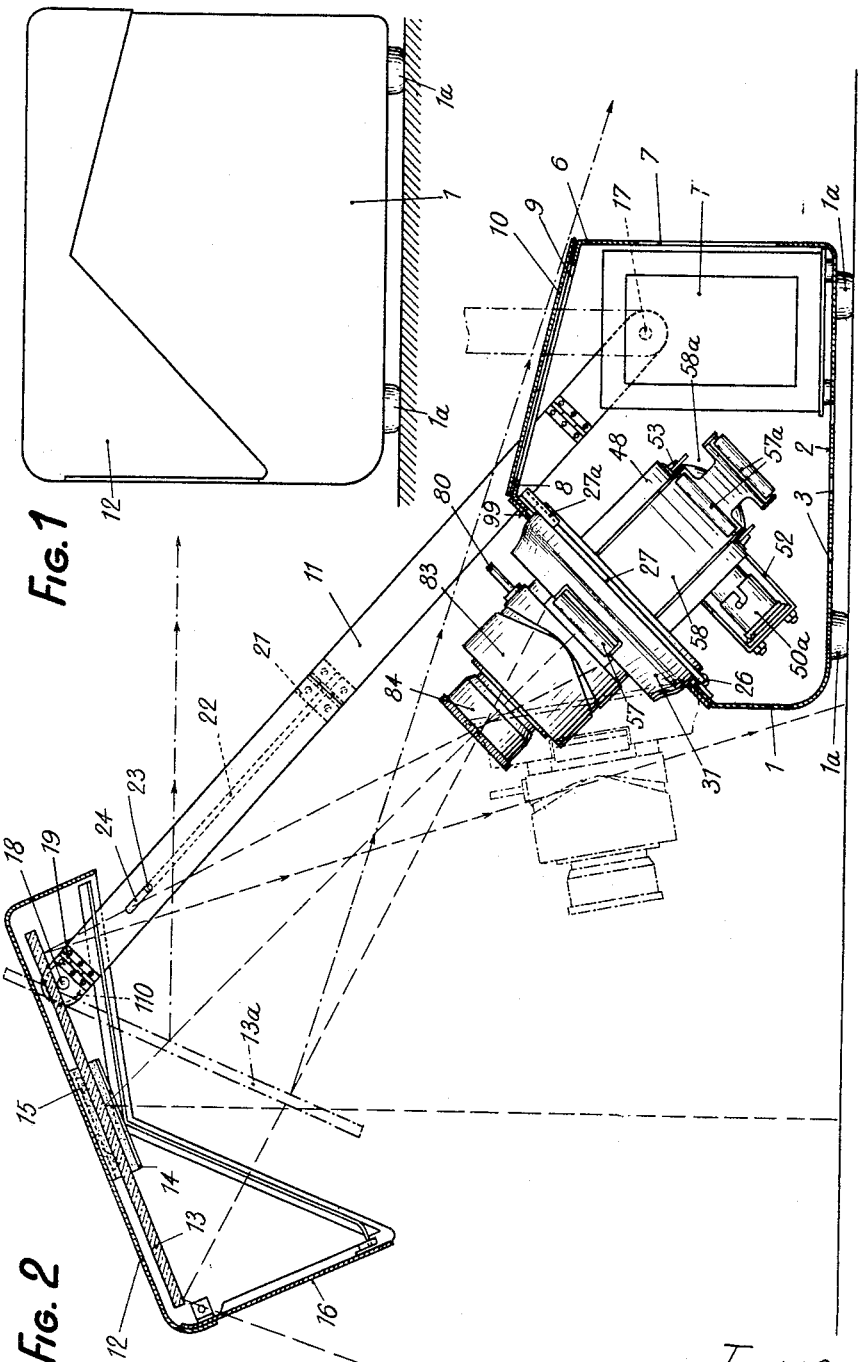
Inventor
R. E. Cherouvrier
By
Young, Emery & Thompson
Attys.

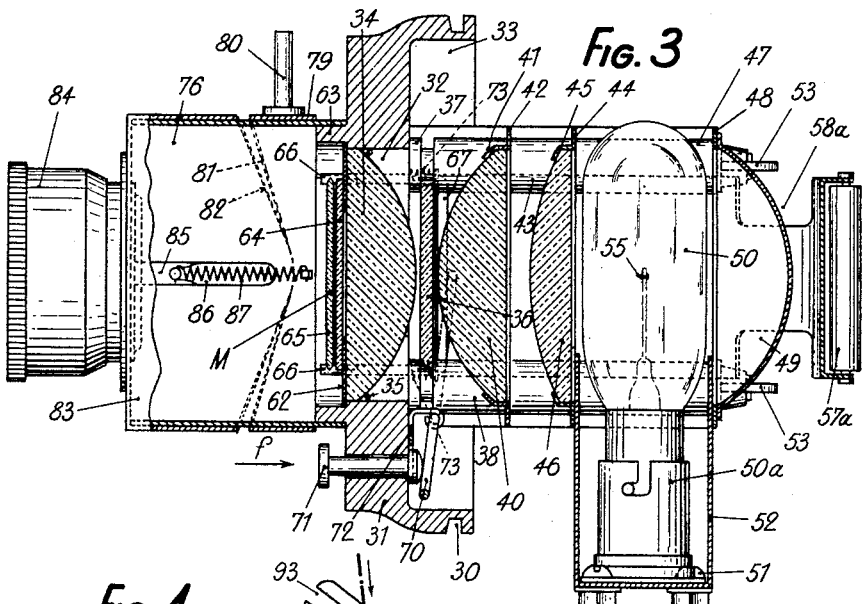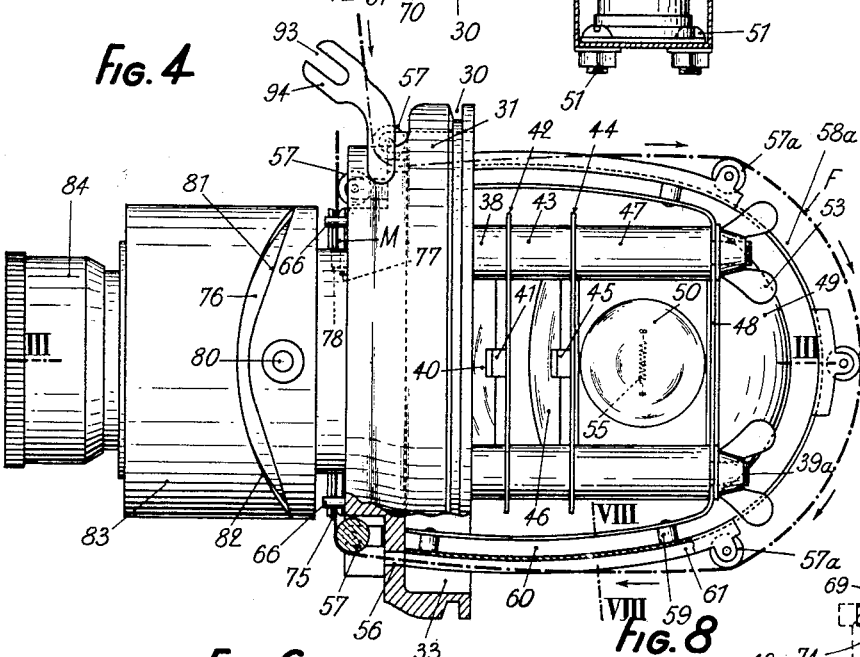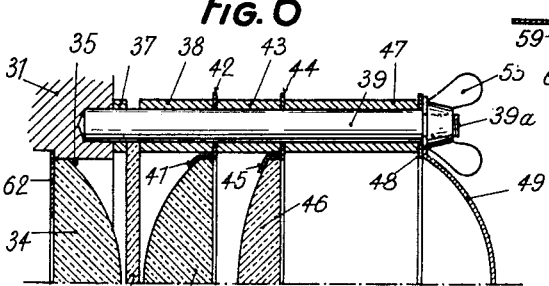

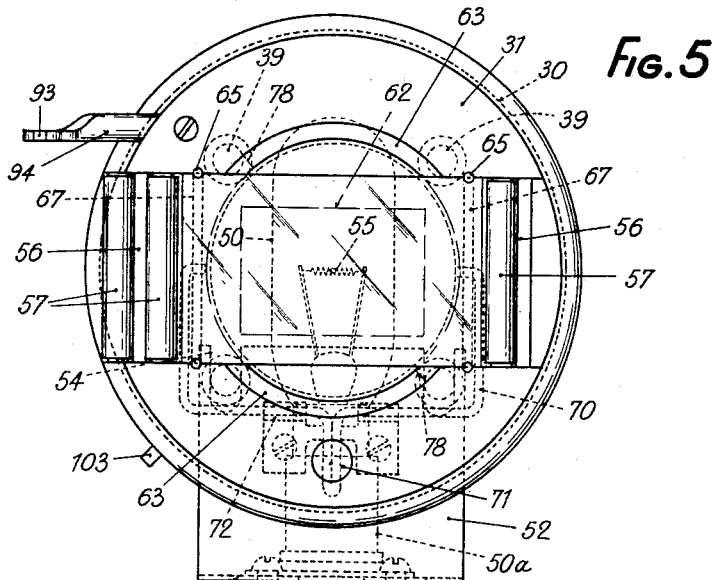
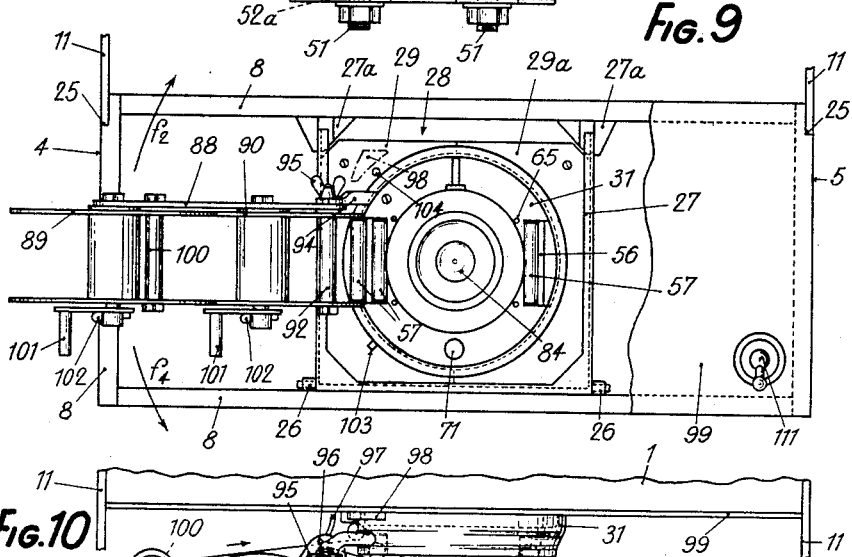
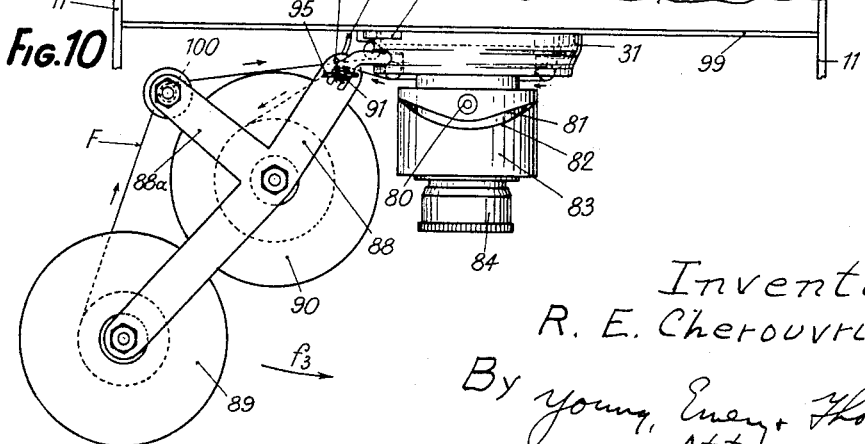

July 5, 1955  R. E. CHEROUVRIER  2,712,266
APPARATUS FOR VIEWING, PROJECTING OR MAGNIFYING
MICROFILMS OR SIMILAR DOCUMENTS
Filed Aug. 18, 1952  4 Sheets-Sheet 4
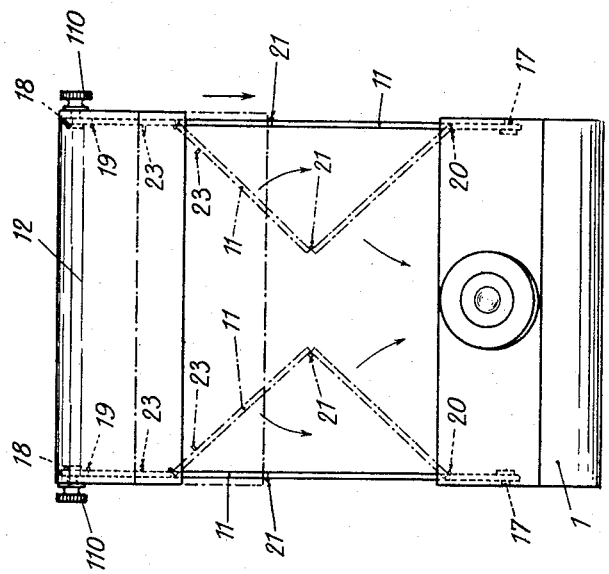
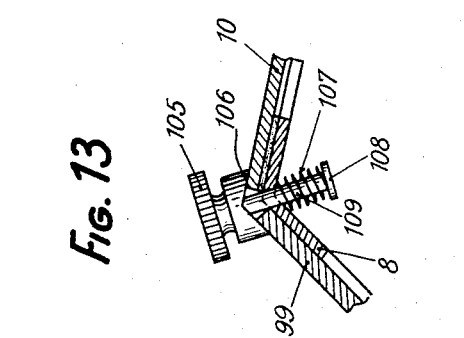
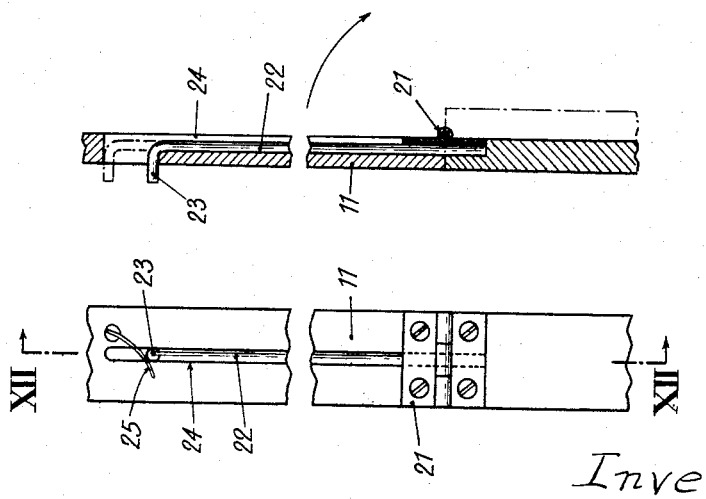
Inventor
R. E. Cherouvrier
By Young, Emery & Thompson
Attys.

United States Patent Office 2,712,266
Patented July 5, 1955

2,712,266

APPARATUS FOR VIEWING, PROJECTING OR MAGNIFYING MICROFILMS OR SIMILAR DOCUMENTS

Robert Ernest Cherouvrier, Paris, France

Application August 18, 1952, Serial No. 305,627

2 Claims. (Cl. 88—24)

Apparatus for magnifying microfilms or other microphotographic documents so as to permit them to be viewed or read by projection on a translucent or non-translucent screen are already known. They present the disadvantage of having a relatively large size and weight so that they are hardly transportable manually and require special space to be used. Moreover they do not lend themselves easily to the swift and occasional examination of microfilms by a person merely having a working desk. This is also a disadvantage. Besides the arrangement of the optical system in such known apparatus does not permit an easy reading of the marginal notes or transversely written references. This again is a disadvantage.

An object of the present invention is to provide an improved apparatus for viewing, reading, projecting or magnifying microfilms or similar documents obviating the aforesaid disadvantages and having a reduced size and weight, which renders it easily portable while enabling the same to be put upon a desk without being cumbersome, the examination of the film being feasible on a table and the projection on any suitable screen with proper magnification, thereby rendering the apparatus particularly useful for pedagogical demonstrations, lectures, readings of papers requiring illustrations and similar purposes.

Another object of the invention is to provide an improved apparatus as aforesaid having the general shape of a desk-shaped box containing all the optical and mechanical elements which are necessary for viewing, projecting or magnifying microfilms or similar documents, said box being fitted with a lid carrying an optical mirror and connected to the box by means of hinged arms permitting said lid to be easily swung down into capping position upon the box after the apparatus has been used.

A further object of the invention is to provide an apparatus as aforesaid wherein the optical system is mounted upon a carrier plate made up of two parts engaged in a groove formed in the head of said system, thereby permitting an angular motion of the latter about its axis so that microfilms or similar documents can be examined or projected either in the vertical direction or in the horizontal direction or in an intermediate direction, depending upon circumstances, said carrier plate being slidable in a frame pivoted upon the box so that the entire optical system can be swung forwardly of the box for easily withdrawing the same from said box.

A still further object of the invention is to provide an apparatus as aforesaid wherein the optical system forms an assembly comprising a condenser made up of two lenses having a small radius of curvature between which is interposed a heat retarding glass, another lens having a larger radius of curvature and a semi-spherical reflecting metal mirror, said assembly being supported by a rigid strutted skeleton frame carried by the head of the optical system, the assembly being held together and yet easily dismountable owing to the provision of wing nuts screwed upon the strutting rods, the light source (electric bulb or its equivalent) and the reflector being held in proper assembled positions while preventing any relative displacement between them owing to the provision of this strutted skeleton frame, thereby ensuring constant focussing and a satisfactory optical definition of the view or image.

With these and such other objects in view as will incidentally appear hereafter, the invention comprises the novel construction, combination and arrangement of parts that will now be described in detail with reference to the accompanying diagrammatic drawings illustrating the same and forming a part of the present disclosure.

In the drawings:

Fig. 1 is an elevational view of the apparatus in closed condition.

Fig. 2 is a sectional view of the apparatus during its use for effecting a reading operation on a table.

Fig. 3 is a longitudinal sectional view along the line III—III of Fig. 4 of the optical system.

Fig. 4 is a top plan view.

Fig. 5 is a front view of the head of the optical system.

Fig. 6 is a semi-sectional view of a detail of the mounting.

Fig. 7 is a detail view.

Fig. 8 is a sectional view on the line VIII—VIII of Fig. 4.

Fig. 9 is a front view of the apparatus as equipped with its system of reels.

Fig. 10 is a top plan view corresponding to Fig. 9.

Fig. 11 is a detail view of an arm for supporting the lid.

Fig. 12 is a sectional view on the line XII—XII of Fig. 11.

Fig. 13 is a sectional view of a detail of the mounting.

Fig. 14 is a diagrammatic view showing the arrangement of the carrier arms for the lid.

In the example as illustrated, the apparatus constructed according to the invention comprises a desk-shaped box 1 supported by legs 1a and comprising a bottom member 2 having perforations 3 for the aeration of the box, a pair of side members 4, 5 (Fig. 9) and a rear wall member 6 also provided with an aeration aperture 7, these several elements being assembled by means of angle irons 8. The upper face 9 of the box 1 which is suitably inclined so as to permit projection to be effected upon a screen arranged to the rear of the apparatus is provided with an aperture through which access may be gained inside the box 1, said aperture being closed by a plate 10 hinged upon one of the angle irons 8. The box 1 is connected by arms 11 to a lid 12 carrying an optical mirror 13 supported on its two faces by fittings 14, gaskets 15 made of a flexible material being interposed. The lid 12 is provided at its front end with a removable plate 16 which can be easily withdrawn when the apparatus is used for effecting a projection on a table.

The arms 11 are pivotally connected at 17 to the box 1 and at 18 to the lid 12. Such arms are so devised as to permit the latter to come into capping position over the box 1 after the apparatus has been used. To that effect, each one of them comprises a hinge 19 arranged at its upper end and a hinge 20 (Fig. 14) arranged at its lower end.

Between these two hinges and substantially midway of the pivots 17 and 18, the arms 11 are provided with a further hinge 21 which permits said arms 11 to be collapsed inwardly (as indicated by the chain lines in Fig. 14) when it is desired to bring the lid 12 back upon the box 1. To that effect, each of the arms 11 is provided with a stem 22 fitted with a control finger 23 having a return spring 25 (Fig. 11) movable in a longitudinal slot 24 in each of the arms 11, said stem ensuring the rigidity of the two parts of each arm 11 situated on the opposite sides of the hinge 21 when the latter is urged downwardly (Figs. 11 and 12) and moreover permitting said two parts to be swung toward each other (Fig. 14) when it is pulled upwardly as shown by the dot-and-dash lines in Fig. 12. Grooves (not visible on the drawings) formed in the assembling angle irons 8 are provided for limiting and guiding the motions of the arms 11 during their action.

Above one of the angle irons 8 arranged on the inclined front face 9 of the box 1 is mounted by means of further hinges 26 a carrier frame 27 open on its upper side and adapted to receive a plate 28 made up of two halves 29 and 29a engageable into a circular groove 30 formed in a head 31 supporting the optical system of the apparatus.

The carrier frame 27 is abutted by means of gusset plates 27a carried by one of the angle irons 8. Therefore it may be swung forwardly about the hinges 26 (as shown by the chain lines on Fig. 1) thereby permitting the entire optical system to be easily disengaged from the box. The head 31 is formed with a circular aperture 32 which opens on its front face, and with a cup-shaped recess 33. The circular aperture 32 accommodates a plano-convex lens 34 having a small radius of curvature which is held in position by a bead 35, its plane face being flush with the front face of the head 31. Rearwardly of the lens 34 is arranged a heat retarding glass 36 held between washers 37 and ties or struts 38 carried by four cylindrical rods 39 operatively connected to the head 31 to form a strutted skeleton frame. A plano-convex lens 40 identical with the lens 34 and located at the same distance from the intermediate heat retarding glass 36 is maintained (as shown in Fig. 6) by cranked lugs 41 carried by a stamped sheet of metal 42 held at the proper spacing between the cited ties 38 and further ties 43, the latter serving the purpose of also holding at adequate spacing another stamped metal sheet 44 which carries by means of cranked lugs 45 a third plano-convex lens 46 having a large radius of curvature. Another tie or strut 47 holds at proper spacing a horse-shoe shaped sheet metal plate 48 also stamped and having fixed thereon (by soldering, welding or otherwise) a semi-spherical reflector 49 made of an aluminium alloy and having a small radius of curvature.

A source of light which may be constituted (as shown by Figs. 3 and 4) by a small voltage electric bulb 50 carried by a socket 50a secured by screws 51 on a base carrier 52 is housed between the lens 46 and the semi-spherical reflector 49, the filament being as near as possible from the lens 46 and centrally aligned with respect to the focus of the reflector 49. The cylindrical rods 39 are provided at their ends with screw-threaded extensions 39a which receive wing nuts 53 which hold up the entire optical assembly while permitting swift dismantling thereof. The base carrier 52 for the bulb 50 is adjustable owing to notches 54 (Fig. 5) which permit the same to be shifted heightwise after loosening of the wing nuts 53 so that the filament 55 of the bulb 50 always coincides with the centre of the optical system. The lower end of the bulb carrier 52 is provided with a pair of ports 52a through which the screws 51 are engaged, said ports permitting the position of the socket 50a to be varied so as constantly to hold the bulb filament 55 in strictly perpendicular relation to the axis of the optical system.

The head 31 is provided with a pair of side slits 56 (Fig. 4) which may or may not be extended outwardly of the head of the optical system and which are adapted to permit a continuous film to be either inserted or withdrawn, also with rollers 57 adapted to guide this film while it travels. A shim 58 (Fig. 8) abutted against the bottom of the recess 33 in the head 31 and terminating adjacent each of the slits 56 carries guiding jockey rollers 57a and is furthermore provided with a pair of small ledges 61 which prevent any undue displacement of the film M after and before it passes through them. Wide notches 58a in the shim 58 permit an easy access to be gained to the wing nuts 53. The front face of the head 31 which receives a masking screen 62 is provided with a pair of semi-circular projections 63 defining a gate ensuring longitudinal guiding of a primary glass plate 64 and a secondary glass plate 65 between which is interposed the microfilm to be viewed.

The two glass plates 64, 65 are held together by a yoke unit comprising four fingers 66 interconnected pairwise by a rod 67, each of these fingers having a flat 68 and a triangular notch 69 (Fig. 7). This yoke unit is subjected to the action of a U-shaped lever 70 which is actuated by a control knob 71 protruding outside the head 31 and pivotally arranged about a hinge comprising a carrier 72 secured to the bottom surface of the recess 33. Pig tail-shaped springs 73 urge the fingers 66 and the lever 70 rearwardly. The glass plate 65 is bevelled on its two longitudinal sides to form a double chamfer 74 matching the triangular notch 69. The glass plates 64 and 65 are also provided on their two sides with a groove 75 facilitating the insertion of the microfilm M to be viewed between said glass plates.

It will be understood from the foregoing that when the knob 71 is moved in the direction shown by the arrow $f$ (Fig. 3) a displacement of the fingers 66 in the direction shown by the arrow $f_1$ (Fig. 7) is produced and that said fingers drive the glass plate 65 forwardly while the glass plate 64 remains in contact with the masking screen 62, which has for its result to allow of the insertion of the microfilm M between the two glass plates 64, 65.

The semi-circular projections 63 on the head 31 receive a sleeve 76 (Fig. 3) which is held against them by means of lugs 77 engageable into notches 78, said sleeve receiving a tubular body member 79 provided with a control rod 80 and having on its front periphery a ramp 81 which cooperates with a ramp 82 formed on the periphery of a cylindrical housing 83 (Fig. 4) carrying the objective 84 which is fitted with its diaphragm and is necessary for reading, projecting and magnifying the microfilms to be viewed. The sleeve 76 is provided with a pair of elongated ports 85 extending along a generatrix thereof and over a portion of its length, said ports forming guides for slug members 86 carried by the cylindrical housing 83. Return springs 87 connect the slug members 86 to the sleeve 76. When it is desired to focus the projection of the microfilm to be viewed, it is only sufficient to produce, by means of the control rod 80, a rotation of the tubular body member 79 which has for its result to bring about a longitudinal displacement of the cylindrical housing 83 which carries the objective 84 against the action of the springs 87, the latter returning the housing 83 to its initial position as soon as a reverse rotation is imparted to the tubular body member 79. This arrangement presents the great advantage of permitting an extremely rapid focussing of the projection.

When it is desired to examine, project or magnify a portion or the entirety of a continuous film, use is made (as shown by Fig. 9) of an adjunctive carrier bridge 88 provided with an unwinding reel 89 and a receiving reel 90 for the film F to be viewed. This carrier bridge comprises an axis 91 carrying a roller 92, which axis is provided with a screw-threaded portion engageable in the eyelet 93 of a lug 94 fixed to the head 31, the carrier bridge 88 being secured thereto by means of a wing nut 95. An abutment pin 96 supported by the carrier bridge 88 limits the position of the latter with respect to the lug 94. In order to permit free passing of the carrier bridge 88 between the arms 11 during the rotation of the optical head in the direction shown by the arrow $f_2$ (Fig. 9) that is to say when effecting a vertical projection of a film on a table there is provided a finger 97 adjacent a ramp 98 carried by a closure plate 99 arranged on the inclined front face 9 of the box 1. When contacting the ramp 98, the finger 97 causes displacement of the carrier bridge 88 in the direction shown by the arrow $f_3$ (Fig. 10) whereby said carrier bridge resumes its initial position as soon as the finger 97 is no longer in contact with the ramp 98.

When it is desired to effect a vertical projection of a film on a screen, it is only sufficient to bring the carrier bridge 88 underneath the optical system while imparting rotation to the assembly in the direction shown by the arrow $f_4$ (Fig. 9). The carrier bridge 88 is provided with an angularly projecting arm 88a which supports a jockey roller 100 adapted to guide the film F at its starting end from the unwinding reel 89. It will be seen by referring to Figs. 4 and 10 how the film travels rearwardly of the head 31, also how it travels between the light source 50 and the objective 84 and how it finally comes back to the receiving reel 90. The winding of the film upon this reel is obtained by means of a crank 101 engaged upon its axis and held in position by means of a cotter pin 102. Where it is desired to check an unduly swift unwinding of the film, a second crank may be secured, if desired, upon the axis of the unwinding reel 89.

In order to prevent the electrical connections leading to the light source 50 from being damaged during multiple rotations of the head 31, the latter is provided with a finger 103 cooperating with an abutment 104 carried by the plate 28 so as to limit to one full revolution the rotation of the head 31 and consequently of the optical system.

The inclined upper plate 10 which permits access to be gained inside the box and to the electrical equipment such as the transformer T may be bound to the closure plate 99 by means of a device such as the one shown in Fig. 13. This device is constituted by a knurled stud 105 having a pair of inclined faces 106 abutted both on the plate 10 and on the closure plate 99, the disengagement of this stud being obtained against the action of a spring 107 abutted against the shoulder 108 of a stem 109 carried by the knurled stud 105 and upon one of the angle irons 8 of the box 1. Proper angular positioning of the lid 12 about the pins 18 and holding thereof in position are obtained by means of a control knob 110 (Figs. 1 and 14) which it is just sufficient to tighten or to loosen depending upon whether it is desired to alter the inclination of the lid 12 or to hold it securely in position. Thus for effecting a projection on a screen arranged to the rear of the apparatus, the inclination of the lid 12 should be so modified as to bring the optical mirror 13 into the position 13a indicated in dot-and-dash lines on Fig. 1, the removable plate 16 being then, if required, put back into its former position forwardly of the lid 12.

A switch 111 mounted upon the closure plate 99 permits the light source 50 to be either illuminated or extinguished. A step-down device may be also coupled to the transformer.

The apparatus for viewing, projecting and magnifying microfilms and other documents which has just been described and which is shown in the accompanying drawings presents the advantage of lending itself to swift dismantling of the entire optical system for cleaning the lenses.

The rotatability of the entire optical system including the light source permits the microfilm or the film to be viewed or projected in any direction, the filament of the light source constantly occupying the same position with respect to the image to which it then becomes connected.

Minor constructional details can be modified within the field of technical equivalencies without departing from the scope of the subjoined claims.

What is claimed is:

1. In an apparatus for viewing and projecting microfilms or similar documents comprising a box having an inclined front face, an aperture provided in said front face, an optical assembly having a head housed in said aperture, a pair of supporting folding arms hinged to said box, a lid for the box, hinged to the upper end of said arms, and an optical mirror arranged inside the lid; a projection aperture provided in the head of said optical assembly, a shoulder element located in said aperture, a primary condenser lens of plano-convex shape arranged within said aperture and resting upon said shoulder element, cylindrical rods operatively connected to the head of said optical assembly, around said aperture for the primary condenser lens, struts engaged over said rods, supporting elements clamped between said struts, a secondary condenser lens of plano-convex shape supported by one of said elements, the convex sides of said primary and said secondary lenses being directed towards each other, a third plano-convex lens supported by another one of said elements, a light source, a carrier for the light source mounted upon said rods rearwardly of the third lens, a hemispherical reflector fitted upon said rods rearwardly of the light source, and nuts screwed upon said rods for holding the lenses, said light source and said reflector in proper assembled position.

2. In an apparatus for viewing and projecting microfilms or similar documents comprising a box having an inclined front face, an aperture provided in said front face, an optical assembly having a head housed in said aperture, a pair of supporting folding arms hinged to said box, a lid for the box, hinged to the upper end of said arms, and an optical mirror arranged inside the lid; a projection aperture provided in the head of said optical assembly, a shoulder element located in said aperture, a primary condenser lens of plano-convex shape having a relatively small radius arranged within said aperture with its convex surface directed rearwardly and resting upon said shoulder element, cylindrical rods operatively connected to the head of said optical assembly, a heat retarding glass, a secondary condenser lens having a plano-convex shape and a radius identical to the radius of said primary condenser lens, a supporting element for said secondary lens engaged over said rods, a third plano-convex lens of greater radius, a supporting element for said third lens, a set of struts engaged over said rods for holding said glass and said supporting elements in exactly parallel planes, a light source, a carrier for the light source mounted upon said rods rearwardly of the third lens, a hemispherical reflector fitted upon said rods rearwardly of the light source, and nuts screwed upon said rods for clamping the supporting elements and the struts together and for holding the lenses, the light source and said reflector in proper assembled condition by providing a rigid assembly.

References Cited in the file of this patent

UNITED STATES PATENTS

| | | |
|---|---|---|
| 2,208,944 | Krupnik | July 23, 1940 |
| 2,222,837 | Goldberg | Nov. 26, 1940 |
| 2,258,382 | Goebel | Oct. 7, 1941 |
| 2,361,398 | Harris | Oct. 31, 1944 |

FOREIGN PATENTS

| | | |
|---|---|---|
| 819,586 | Germany | Nov. 5, 1951 |